W. R. CLARKE.
CONFECTIONER'S DIPPING TRAY.
APPLICATION FILED OCT. 9, 1908.
929,555.
Patented July 27, 1909.
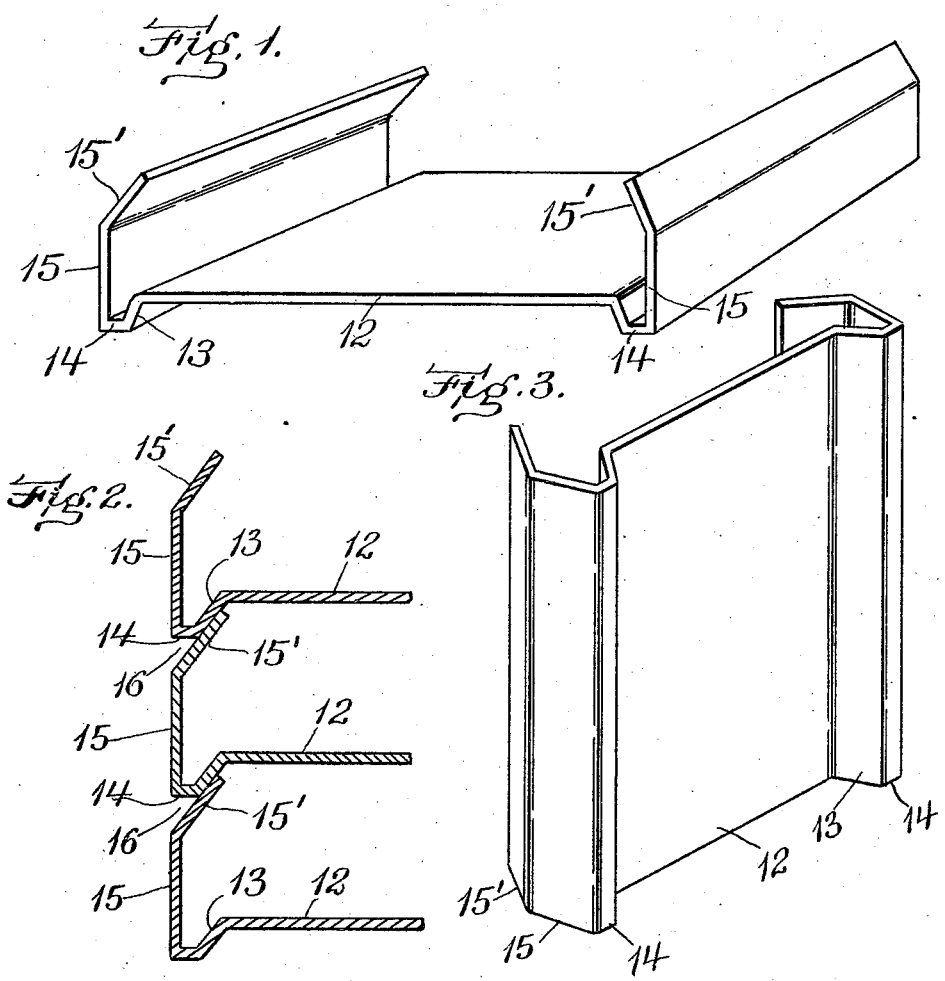
Witnesses.
P. W. Pezzetti
F. R. Roulstone
Inventor.
W. R. Clarke
by Wright Brown Quinby May
Attys.

UNITED STATES PATENT OFFICE.

WILLIAM R. CLARKE, OF READING, MASSACHUSETTS.

CONFECTIONER'S DIPPING-TRAY.

No. 929,555.   Specification of Letters Patent.   Patented July 27, 1909.

Application filed October 9, 1908. Serial No. 456,914.

To all whom it may concern:

Be it known that I, WILLIAM R. CLARKE, of Reading, in the county of Middlesex and State of Massachusetts, have invented certain new and useful Improvements in Confectioners' Dipping-Trays, of which the following is a specification.

This invention relates to so-called dipping trays or boards used in candy factories to support chocolate creams and other confections, consisting of a core or body coated with chocolate.

It is the practice in making chocolate creams and other like confections, to dip the cores or body portions in a semi-fluid preparation composed mainly of chocolate and cocoa butter, and to deposit the confection thus formed on flat trays, a number of which are piled in a stack, and transported, while stacked, to the part of the factory where they are left while the chocolate coatings harden.

The trays are usually made of wood, each being usually composed of a flat wooden body and two upwardly projecting flanges at the ends thereof, the flanges of each body being adpted to support another tray deposited upon them.

Portions of the soft chocolate of which the coatings are made are liable to drop upon the trays, these portions adhering rather tenaciously to the wood of which the trays are made, so that an attempt to scrape them off and prevent waste is liable to remove splinters from the wood with the chocolate. The waste chocolate cannot be reclaimed by washing with hot water or steam, because these agents would dilute and spoil the chocolate. The waste chocolate cannot be thoroughly removed from the wood by dry heat or air sufficiently heated to melt the chocolate, because a considerable part of the melted chocolate and cocoa butter will adhere to the fibers of the wood.

I have found that a dipping tray made of smooth surfaced aluminum or other suitable metal, is free from the above noted objections to a wooden tray, waste chocolate deposited thereon being adapted to be readily removed when the tray is subjected to hot air, by placing the tray with its supporting surface in a vertical position, so that the melted chocolate is free to flow by gravitation from the tray.

The invention consists in a metal tray adapted not only to stand on edge on a horizontal support so that melted chocolate will flow from it, but also to be assembled with other trays in a stack or pile and transported from one part of a factory to another, without liability of edgewise displacement of either tray relatively to the others, and therefore without liability of one tray dropping onto the coated confections supported by the tray beneath it.

The invention consists in the improved tray which I will now proceed to describe and claim.

Of the accompanying drawings, forming a part of this specification,—Figure 1 represents a perspective view of a dipping tray embodying my invention. Fig. 2 represents a sectional view of a portion of a pile of trays. Fig. 3 represents a perspective view of a tray embodying my invention, standing on one edge to permit melted chocolate to flow from it.

The same reference characters indicate the same parts in all the figures.

In the drawings, 12 represents the body portion of a dipping tray adapted to support chocolate creams or other chocolate-coated confections. Said body portion is composed of a sheet or thin plate of aluminum or other suitable metal, two opposite end portions of which are bent downwardly to form lower inclines 13, 13, outwardly to form necks 14, 14, and upwardly to form flanges 15, 15, the upper portions of which are bent inwardly to form upper inclines 15', 15'. The said parts are so arranged relatively to each other that a number of trays are adapted to be piled or stacked, as shown in Fig. 2, the inclines 13 of each tray bearing on the inclines 15' of the tray below it. The necks 14 of each tray project outwardly from the inclines 15' of the next lower tray, said necks and inclines forming recesses 16 which permit the operative's fingers to engage each tray and lift it from the tray on which it has been deposited.

In practice, a plurality of trays on which chocolate-coated confections have been deposited, are stacked, as indicated in Fig. 2, the flanges of each tray supporting the next tray above it, above the charge of confections, edgewise displacement of either tray relatively to the next tray being prevented by the frictional engagement of the inclines 13 of one tray with the inclines 15' of the next tray below it, thus firmly holding the trays against relative shifting in any direction.

It will be seen that the inclines 13 of each tray project from one side of the plane of the body portion 12, while the inclines 15' project from the opposite side of said plane, the arrangement being such that the tray is adapted to stand on one edge, as shown in Fig. 3, all its surfaces on which waste chocolate is liable to be deposited standing vertically. When it is desirable to remove waste chocolate from a tray and reclaim the chocolate, the tray is placed on edge on a horizontal support, in a suitable space or apartment, and subjected to the action of hot air at a sufficient temperature to melt the waste chocolate on the tray. The chocolate thus melted flows down the vertical surfaces of the tray onto the surface below where it accumulates and may readily be reclaimed, the melted chocolate separating freely from the metal surfaces of the tray and its extensions 13, 14 and 15.

The sheet or plate metal tray above described, besides having the advantages over wood of readily releasing melted chocolate under the influence of dry heat, has the further advantage of being practically unbreakable under the rough usage to which dipping trays are subjected by the irresponsible help usually employed in candy factories. The inclines 13, necks 14, and flanges 15 form hollow ribs extending across the ends of the tray and materially increasing its stiffness. Furthermore, this formation not only enables a tray to be set on a table by itself, the under sides of the ribs forming feet so as to hold the flat portion 12 out of contact with such table or with any loose material that may be on such table, but the inside of said ribs form channels or gutters into which melted chocolate may run and from which it can be poured out at either end.

I claim:

1. A metal dipping tray comprising a body portion and end extensions integral therewith projecting from both sides of the plane of the body portion and adapted both to sustain the tray on edge and to engage corresponding parts of other trays in a stack, the free edges of said extensions being inwardly inclined.

2. A metal dipping tray comprising a body bent at its end portions to form lower inclines projecting from one side of the body, necks projecting outwardly from said inclines and flanges extending from said necks crosswise of the body, said flanges being bent to form upper inclines adapted yieldingly and frictionally to engage the lower inclines of another tray, the said lower and upper inclines being at opposite sides of the plane of the body, and adapted to support the latter on edge.

3. A metal dipping tray comprising a flat body portion and sides integral with the body portion and formed with channels or gutters between said flat portion and sides, said channels or gutters being open or unobstructed at each end.

In testimony whereof I have affixed my signature, in presence of two witnesses.

WILLIAM R. CLARKE.

Witnesses:
C. F. BROWN,
P. W. PEZZETTI.